3,809,672
HYDRATES AS CURING AIDS
David A. Stivers, St. Paul, Minn., assignor to Minnesota Mining and Manufacturing Company, St. Paul, Minn.
No Drawing. Filed Aug. 21, 1972, Ser. No. 282,032
Int. Cl. C08f 45/04
U.S. Cl. 260—42.27                            8 Claims

ABSTRACT OF THE DISCLOSURE

A hydrated compound releasing water at above about 130° C. is included in a curable vinylidene fluoride elastomer formulation to provide desirable curing characteristics.

---

This invention relates to a method for cross-linking fluorinated polymers and crosslinking compositions for use therein. In particular, this invention relates to compositions having improved processing characteristics and more particularly to compositions comprising adjuvant amounts of hydrates releasing water at or below press-curing temperatures.

In general, linear polymers are thermoplastic in nature and exhibit flow under the influence of heat and pressure. Such polymers can be resoftened as often as desired and are usually soluble in selected solvents. However, cross-linked or vulcanized polymers are generally thermoset, i.e., insoluble in most solvents and incapable of being re-softened without decomposition, because they become permanently hardened. A linear polymer may, nevertheless, contain a small number of crosslinkages without completely losing its thermoplastic properties. It is generally desirable to convert thermoplastic elastomers into cross-linked elastomers in order to decrease their solubility and thermoplastic flow properties and to obtain a harder and tougher product. The crosslinking of elastomers is commonly referred to as vulcanization.

Among the most difficult vulcanizable thermoplastic polymers are those prepared by the polymerization of halogenated monoolefins, such as, for example, the copolymers of chlorotrifluoroethylene and vinylidene fluoride, the copolymers of perfluoropropene or pentafluoropropene and vinylidene fluoride and the terpolymers of perfluoropropene, vinylidene fluoride and tetrafluoroethylene. Many of these fluorinated thermoplastic polymers have unique and valuable properties. The polymers are cross-linked to retain these properties and at the same time decrease the thermoplastic flow and solubility.

In order to provide a molded, cured product from a fluoroelastomer such as those above, a complex procedure must be followed, each step of which influences both the properties and the cost of the final product. Initially, a uniform mixture of the desired formulation of gum stock and filler, curatives, processing aids, etc. must be prepared. Mixing can be done, for example, on a Banbury mixer or on a two roll mill, but, because of the toughness of the gum stock and the intensive mixing action, considerable internal heat is generated which must be controlled in order to avoid premature curing, which would effectively prevent proper forming or molding. The mixing operation is best carried out so that the temperature of the mass does not exceed 120° C. (250° F.) and preferably is maintained between 95 and 120° C. (200° and 250° F.) by appropriate cooling. The resultant formulated gum stock may then be set aside for whatever period of time may be desired, varying from hours to months, until the final forming operation is undertaken. This forming may be effected by extrusion, by molding using closed molds, or by any of the other common forming operations in the elastomer industry. In most cases, the product is molded. In this operation the gum stock is heated to the desired temperature, generally in the range of 150–205° C. (300–400° F.) and mechanically forced into the mold, which is preheated to the approximate molding temperature. Alternatively, a weighted portion of the formulated gum stock may be placed in the cavity of the mold and the mold closed and heated. In either process, the stock must flow uniformly throughout the mold to fill all of the inner portion and must flow together and join integrally and uniformly at the interface of two or more flow streams. At the molding temperature, initial curing takes place and must continue to a sufficient stage of cure so that the molded part will maintain its integrity without distortion or tearing when it is released and removed from the mold. The higher the mold temperature, the more rapidly such a "press cured" state can be attained. However, sufficient time must be allowed for the mold to be filled uniformly, and hence this is a practical maximum temperature. Ideally, the viscosity should not increase significantly during the initial flow which fills the mold but should then increase very rapidly to attain a sufficiently stable state for removal.

After removal from the mold, the part is customarily post cured or oven cured. If the cure has not advanced sufficiently during the molding step, the gases released during final cure may result in bubbling, blistering and distortion.

The utility of cured fluoroelastomers depends upon solvent resistance, good compression set characteristics, and resistance to degradation of properties at elevated temperatures. These properties, combined with the generally good elastomeric characteristics of fluoroelastomers, have resulted in the use of a relatively narrow range of compositions in which the major molar component, commonly vinylidene fluoride, is combined with lesser molar amounts of one or more of perfluoropropylene, tetrafluoroethylene, trifluorochloroethylene or monohydroperfluoropropylene. A filler is generally required from any of a variety which have been suggested for use, although the filler usually selected is a medium reinforcing thermal carbon black.

Because the characteristics of the cured product are determined largely by the particular curing system used, most of the improvements in the characteristics of the final product have resulted from improved curing systems. The curing system dictates the conditions of mixing, forming, and curing, which have a major influence on the cost of the final product as well as exerting its influence on the physical and chemical properties. The polyamine curing systems that first enabled the achievement of satisfactory commercial products continue to dominate the field. Long experience with polyamine systems has allowed safe handling and reliable processing, with the major difficulty being the tendency toward permanent deformation after extended use, that is, "compression set."

A curing system based on quaternary ammonium derivatives has been developed (U.S. Pat. 3,655,727) which has many of the desirable handling characteristics of the polyamine system, but produces a final product with much higher resistance to compression set. This curing system allows safe milling at 90–120° C. (200°–250° F.) and molding temperatures in the range of 160–170° C. (320–335° F.) with good flow and a short cure cycle. Cure is so rapid, in fact, at these temperatures that the stock tends to be "scorchy" and careful handling is required to avoid curing during the milling operation.

To a considerable extent these difficulties are overcome by use of quaternary phosphonium curing system based on the presence of a compound in which the phosphorus atom is covalently bonded to 4 carbon atoms and ionically bonded to an anion. The covalent substituents can be straight-chain, branched or cyclic organic radicals, saturated, unsaturated or aromatic. Generally, 4 monovalent organic radicals are present, although the phosphorus atom can be part of a heterocyclic ring. Quaternary phosphonium compounds are generally used in conjunction with an accelerator which is a nucleophilic organic compound in which one or more hydroxyl, primary amino or secondary amino radicals are bonded through the oxygen or nitrogen atoms to an aromatic nucleus. Conventional acid acceptors, modifiers, and fillers, particularly the carbon blacks, can be used. Such systems produce a compound which is much safer than the quaternary ammonium systems, provide good mold flow and satisfactory cure times over a temperature range between about 150° C. (300° F.) and 230° C. (450° F.) and particularly from about 175-190° C. (350-370° F.). The characteristic viscosity versus time curves for such formulations show relatively slow buildup of viscosity up to a certain point and then a very rapid increase and thus allow safe mixing on mill or Banbury, extended storage, and economical curing at press conditions. In many cases, however, particularly where the molds are heated by steam, the molder is limited to temperatures of 150-170° C. (300°-335° F.) which are in the lower part of the range. At these temperatures, curing occurs, but at such a slow rate that undesirably long mold cycles are required, particularly where thicker mold sections are involved. This affects the economy of the operation adversely.

It is an object and aim of this invention to provide curable floroelastomer compositions having shortened press curing at temperatures of about 150° C. (300° F.) or higher in which the period of initial slow increase of viscosity is somewhat decreased without materially affecting the desirable subsequent rapid increase in viscosity or the later oven curing.

Other objects will become evident from the disclosure herein.

It has been found in accordance with the above and other objects of the invention that incorporation of a composition containing water relatively firmly bonded at room temperature but readily released at an elevated temperature into the floroelastomer gum stock in addition to the usual curing ingredients, allows press curing to be accelerated without adversely affecting the stability of the formulation at lower temperatures and without adversely affecting the final characteristics of the product. Such an additive composition is here referred to as a hydrate. The accelerating characteristic of hydrates is particularly important, in the case of carbon-filled systems, with the quaternary phosphonium formulations. It has also been found that the presence of a hydrate additive allows rapid press cures of silica-filled formulation whether the system is based on quaternary ammonium or quaternary phosphonium curvatives, although the ammonium systems tend to be somewhat scorchy, i.e., they may start to cure at an excessively low temperature such as encountered in milling.

A wide variety of hydrates has been found useful particularly in particle sizes below about 75 microns (i.e. 200 mesh) and preferably below about 40 microns. In order to avoid premature loss of water during handling and mixing, it is preferred that the water of hydration not be lost below about 120° C. (250° F.) under normal humidity conditions. It will be recognized that most hydrates will lose water at sufficiently low water partial pressures, i.e. at 120° C., although polyhydrates that lose a portion of their water of hydration a low temperatures but retain at 120° sufficient water of hydration to accelerate the press cure, are also useful. In general, there should be at least one hydrate which has a dissociation pressure at 120° C. of not more than about 25 mm. Hg and preferably not more than about 12 mm. Hg. The water of hydration should be available at press curing temperatures. Thus, at least one hydrate must have a dissociation pressure at 175° C. (350° F.) of at least about 10 mm. Hg.

Although hydrated organic compounds, such as aldehyde hydrates, can be used, the inorganic hydrated salts such as magnesium sulfate heptahydrate, or the inorganic hydrated salts of organic acids, such as cobalt acetate tetrahydrate are preferred. Such salts are herein termed "inorganic" salts although the molecule may not be entirely inorganic and are alternatively referred to as hydrated salts or merely as hydrates or salt hydrates. They may be neutral, basic or acidic, but neutral and basic are preferred, because the formulations are generally basic in nature and hence combinations with acidic hydrates may interfere with proper water release characteristics because of neutralization reactions. In general, the preferred species are neutral or basic hydrated salts.

For convenience in handling, it is preferred that the hydrates be solid at room temperature and have a melting point at least about 38° C. (100° F.) and more conveniently about 65° C. (150° F.) or higher.

The amount of the salt hydrate added depends upon the percent of water content, as well as the level of acceleration desired and the size of the piece being molded. Generally as little as 0.1 part of water releasable under the conditions of press curing per 100 parts of elastomer gum will produce a significant effect, and more than about 5 parts per 100 will be deleterious. Generally, about 0.2 to 1.5 parts per 100 is preferred.

Acceleration of press cure can usually be obtained by increasing the quantity of the active base, e.g., $Ca(OH)_2$, in the formulation but such an increase in amount of base provides a harder vulcanizate with much lower elongation and lower heat resistance and is therefore frequently undesirable.

Compositions in which hydrates are found useful to provide a press-cure at about 150° C. (300° F.) comprise, together with filler, acid acceptor, etc., the following components:

(A) A fluorinated elastomeric copolymer of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units.

(B) At least one quaternary phosphonium or quaternary ammonium compound, including quaternary phosphonium and ammonium hydroxides and salts thereof.

(C) A hydrate containing water relatively firmly bonded at ambient temperatures but readily released at a temperature of from about 120° C. (250° F.) to about 1757 C. (350° F.). In this connection, lower alkyl or fluoroalkoxy means up to about four carbon atoms.

The vulcanizable polymers which are cured according to this invention are widely known linear, saturated, fluorinated polymers which contain reactive substituents selected from the group consisting of hydrogen, fluorine and chlorine and which are at least half halogenated. By "half halogenated" is meant that at least one-half of the carbon bonded hydrogen atoms of the analogous non-halogenated polymer are replaced by halogen. The preferred vulcanizable polymers are at least half fluorinated; however, it is critical that the polymer chain include —$CH_2$— units. Homopolymers of tetrafluoroethylene and other perfluorinated olefins, and copolymers thereof with other perfluorinated comonomers require very high temperature to effect crosslinking and are not within the scope of this invention.

Linear fluorinated elastomers generally contain disordered, saturated, fluorinated carbon chains which include a substantial number of —$CH_2$— units, usually at least 10 percent of the chain carbon atoms. Disorder in the carbon chains is ordinarily achieved by the copolymerization of at least two monoolefinic compounds of the type hereinafter described. When one of the monoolefinic compounds contains an unsaturated chain of three or more carbon atoms, alkyl side groups, e.g. methyl, ethyl, etc., are present in the final polymer, and these alkyl groups are preferably perhalogenated, most preferably perfluorinated. Points of unbalance in the carbon chain, which are necessary for elastomeric properties, are provided by these side groups. Such side groups cause a bending of the linear carbon chain and thus provide additional degrees of freedom in space, producing an unsymmetrical chain carbon atom to which they are attached. However, unbalance is also provided by the presence of other unsymmetrical units in the linear carbon chain, such a —CFCl—. Irrespective of the units providing such points of unbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto to produce instability or to influence the chemical nature of the elastomer. The presence of more than one chlorine substituent on a single chain carbon atom produces a point of rigidity in the chain, decreasing the flexibility of the chain and the elastomeric properties accordingly.

Among the saturated polymers which may be crosslinked in accordance with this invention are the fluorinated elastomeric copolymers of chlorotrifluoroethylene, vinylidene fluoride, 2-chloroperfluoropropene, a fluorinated methyl vinyl ether, perfluoropropene, tetrafluoroethylene, 1-hydroperfluoropropene (i.e. $CFH=CFCF_3$), dichlorodifluoroethylene, trifluoroethylene, 1,1-chlorofluoroethylene and vinylidene chloride. These monoolefins may be copolymerized with each other in groups of two or more. They may also be copolymerized with other olefinic compounds such as ethylene. The preferred elastomers are copolymers of vinylidene fluoride with at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl (e.g. perfluoroalkyl of 1-4 carbon atoms) or fluoroalkoxy radical of 1-4 carbon atoms particularly perfluoropropene, tetrafluoroethylene, chlorotrifluoroethylene and 1-hydroperfluoropropene. Particularly preferred are the fluorinated elastomers produced by copolymerizing perfluoropropene and vinylidene fluoride, as described in U.S. Pat. Nos. 3,051,677, issued Aug. 28, 1962 and 3,318,854, issued May 9, 1967 and those terpolymers produced by copolymerizing perfluoropropene, vinylidene fluoride and tetrafluoroethylene as described in U.S. Pat. No. 2,968,649, issued Jan. 17, 1961. The elastomeric copolymers of perfluoropropene and vinylidene fluoride having between about 15 and about 50 mole percent perfluoropropene are outstanding in this respect. Mixtures of elastomers are also suitable, for example, a mixture of 70-95 parts of an elastomeric perfluoropropene-vinylidene fluoride copolymer with 30-5 parts of an elastomeric trifluorochloroethylene-vinylidene fluoride copolymer.

The quaternary phosphonium compounds useful in preparing curable fluoroelastomer compositions are compounds which contain at least one phosphorus atom covalently bonded through carbon-phosphorus single bonds to four organic radicals and, additionally, through an ionic bond to an anion. Such materials, their characteristics and several methods of preparation are described, for example, in "Organophosphorus Compounds," G. M. Kosolapoff (John Wiley and Sons, New York, 1950), particularly chapter five. The four organic radicals bonded to each phosphorus atom may be the same or different, and each radical may contain from one to twenty or more carbon atoms, although two to about eight carbon atoms are preferred. The carbon skeletal chain may be linear, branched, or cyclic and may be saturated or unsaturated and may contain atoms other than carbon, such as oxygen, nitrogen or sulfur in addition to carbon. The chain may be substituted or unsubstituted, but the substituents, if any, should preferably not be a strongly acidic radical (i.e. a radical derived from an acid having an ionization constant in water at 25° C. of at least $10^{-5}$) or a salt thereof (e.g. carboxyl, sulfonic, or phosphonic acid or salts thereof) although active hydrogen in a weakly acidic form, such as a hydroxyl radical, is acceptable in small amounts, e.g. 0.5% by weight or less of the compound. Quaternary phosphonium compound having too high a molecular weight diffuse less efficiently through the fluorocarbon polymer during the curing process, thus tending to result in some unevenness in cure and less preferred physical properties in the resulting vulcanizate. A generally satisfactory cure can be obtained most effectively with a compound having a molecular weight of not more than about 1000, and in most cases a molecular weight of not more than about 500 is preferred. The nature of the anion is not critical and is generally determined by the nature of the reactants used in synthesizing the phosphonium compound. The anion is generally monovalent, but it may also be divalent or polyvalent. Typical anions are chloride, bromide, hydroxyl, methoxy, acetate, mercaptate, sulfate, bisulfate and the like. Neutral salts are preferred over acidic or basic phosphonium compounds because of their better stability and easier handling, although it should be recognized that the compounds are normally converted to the basic form during compounding, since the vulcanizable composition generally contains large amounts of a relatively strong base such as magnesium oxide or calcium hydroxide.

Although useful vulcanizates can be obtained using the quaternary phosphonium compounds alone as curatives, it is frequently desirable to use in addition an accelerator, i.e., a material which significantly increases the rate of cure under curing conditions without unduly accelerating the rate of crosslinking during mixing and milling. The resulting combination generally has a more desirable balance of scorch and cure rate than compositions containing only the quaternary phosphonium compound. Such accelerators are well known and are described in the literature, for example, in U.S. Pats. 3,243,411 and 3,502,628. A particularly preferred class of accelerators is the oxidizable aromatic hydroxy or amino compounds, that is nucleophilic compounds in which one or more hydroxyl, primary amino, or secondary amino radical is bonded through the oxygen or nitrogen atom of the radical to an aromatic nucleus, such as phenyl, naphthyl, and the like.

A further component which desirably is contained in the final curing recipe is an acid acceptor, preferably an inorganic acid acceptor. Suitable acid acceptors are bases and include magnesium oxide, lead oxide (litharge, PbO), dibasic lead phosphite and zinc oxide, with magnesium oxide being preferred. The acid acceptors are used in amounts ranging from 2 to 25 parts per 100 parts of polymer. In addition an "optional base" is often desired as a cure accelerator. These optional bases are basic compounds and include inorganic oxides and hydroxides such as calcium hydroxide, barium carbonate, strontium hydroxide, and the like. The optional bases are preferably used in amounts ranging from 0.5 to 10 parts per 100 parts of polymer.

Although not necessary, the composition may also contain as cocuratives at least one aromatic amine (primary, secondary or tertiary), aliphatic tertiary amine, or a compound, which is stable in the absence of water at temperatures below about 75° C. and which at temperatures above about 125° C. in the presence of water generates a basic nitrogen atom-containing compound (i.e., a compound having a $pK_b$ in water of no more than about 14) having at least one hydrogen atom bonded to said basic nitrogen atom (preferably generates a primary or secondary amine, a hydrazine or ammonia), all of which will be referred to herein as "amines." Amines having too high a molecular weight diffuse less efficiently through the fluorocarbon polymer during the curing process, thus tending to result in uneven cure and inferior physical properties of the resulting vulcanizate. Generally, a satisfactory cure can be obtained most effectively with an amine having a molecular weight of not more than about 1000, and in most cases, an amine having a molecular weight of not more than about 500 is preferred. In order to obtain optimum physical properties, particularly resistance to changes during aging and resistance to solvents, it is desirable that the amine equivalent weight (i.e., total molecular weight divided by the number of basic nitrogen atoms in the molecule) in the free amine should be no greater than about 500, and preferably no greater than about 300.

The hydrates which are incorporated as noted above are preferably relatively finely divided, able to pass a 75 micron screen, and should release at least a portion of their water at temperatures in the range of about 100°–200° (212°–400° F.). They are used in amount to give about 0.1 to 3 and preferably 0.2 to 1.5 parts of water per hundred parts of rubber (pphr.). A tabulation of representative inorganic salts having suitable temperatures for loss of water is given in Table I. In this table $(C_6H_5O_7)$ is citrate, $(C_5H_9O_2)$ is valerate and $(C_6H_5SO_4)$ is p-hydroxybenzenesulfonate. Many of these hydrates lose their water in stages and such may be indicated.

TABLE I.—TYPICAL HYDRATED SALTS

| Type hydrated salt | Mol wt. | H₂O lost/ °C. | H₂O lost/ °C. |
|---|---|---|---|
| Al₂(SO₄)₃·(NH₄)₂SO₄·24H₂O | 906 | 20/120 | 4/200 |
| Al₂(SO₄)₃·18H₂O | 666 | d. 86 | |
| Ba(Ac)₂·H₂O | 273 | 1/150 | |
| AlNH₄(SO₄)₂·12H₂O | 452 | 10/120 | 2/200 |
| Zn(BrO₃)₂·6H₂O | 429 | 6/200 | |
| Zn(C₆H₅SO₄)₂·8H₂O | 458 | 8/125 | |
| CaC₂O₄·H₂O | 128 | 1/200 | |
| ZrOCl₂·8H₂O | 322 | 6/150 | 2/210 |
| Ca₃(C₆H₅O₇)₂·4H₂O | 570 | 2/130 | 2/185 |
| CaSO₄·2H₂O | 172 | 1.5/128 | .5/163 |
| Ca(NO₃)₂·4H₂O | 236 | d. 132 | |
| Cd(Ac)₂·2H₂O | 284 | 1/130 | |
| Co(PO₄)₂·8H₂O | 510 | /200 | |
| Co(acetate)₂·4H₂O | 249 | 4/140 | |
| CoI₂·6H₂O | 420 | /130 | |
| CuCl₂·3CuO·4H₂O | 445 | 3/140 | |
| Fe(NH₄)(SO₄)₂·12H₂O | 482 | 12/230 | |
| Fe(SO₄)₂·7H₂O | 278 | 6/100 | |
| K₄P₂O·3H₂O | 384 | 2/180 | 1/300 |
| K₂S·5H₂O | 200 | 3/150 | |
| LiSO₄·H₂O | 127 | 1/130 | |
| Mn(C₅H₉O₂)₂·2H₂O | 293 | 3/160-170 | |
| Mg(BrO₃)₂·6H₂O | 388 | 6/200 | |
| MgSO₄·7H₂O | 246 | 6/150 | 1/200 |
| Mg₂O₃·6H₂O | 244 | 3/170 | |
| (NH₄)₂SO₄Pr₂(SO₄)₃·8H₂O | 846 | 8/170 | |
| VF₃·3H₂O | 162 | 3/130 | |
| NiBr₂·3H₂O | 272 | 3/200 | |
| NaBO₃·H₂O | 99 | 1/130-150 | |
| Na₂B₄O₇·10H₂O | 381 | 8/60 | 2/200 |
| Na₃C₆H₅O₇·2H₂O | 294 | 2/150 | |
| Na₂SO₃·7H₂O | 252 | 7/150 | |
| SrC₂O₄·H₂O | 193 | 1/150 | |

The mechanism of curing saturated copolymers of vinylidene fluoride with, for example, perfluoropropene, is not fully understood. Existing evidence suggests that the initial press cure involves a base-catalyst release of hydrogen fluoride to generate double bonds in the polymer, these double bonds then providing a limited number of crosslinks between the polymer chains which serve to stabilize the shape and form of the polymer, while the subsequent postcure step results in the formation of further ethylenically unsaturated structures which combine to form benzenoid crosslinks of high thermostability. This is consistent with the observation that a variety of compositions function as curing or crosslinking agents, acting to aid in the release of hydrogen fluoride. Most free primary or secondary aliphatic amines (insofar as they are not in themselves amine generators), free hydrazine or free ammonia are not suitable as cocuratives, and their use as such results in either too rapid a cure rate or no cure at all. Compounds equivalent to the amines, such as triphenylstibine, triphenylbismuthine, triphenyl-arsine, dibutyl tin sulfide and tributylphosphine, may also be employed in similar fashion as cocuratives.

The quaternary compound, alone or premixed with other compounding ingredients, may be conveniently milled into the elastomer gum stock, either as a finely divided solid or as a solution in an inert, volatile solvent, e.g., methanol. Thus mixed, the stock can be stored at room temperature (i.e., about 27° C. (80° F.)) for extended periods. It may also be desirable in some instances to employ retarding agents, plasticizers, fillers, and other conventional additives.

The proportions of components for a typical curing system are set forth below in parts by weight. All amounts referred to herein are in parts per 100 parts of polymer, unless otherwise indicated, which is abbreviated "pphr." or alternatively "parts phr." These proportions are general ranges and the particular amount for each particular cure, time and temperature will become apparent to those skilled in the art.

FORMULATION LIMITS

| Component: | Parts phr. (range) |
|---|---|
| Quaternary phosphonium compound | 0.1–5 |
| Hydrate (as available water) | 0.2–1.5 |
| Acid acceptor | [1] 0–25 |
| Optional base | [1] 0–25 |
| Oxidizable hydroxy or amino compound | 0–5 |
| Amine | 0–2.5 |

[1] Together 3–40.

Although useful elastomers are obtained within the aforementioned formulation limits, elastomeric products having particularly desirable compression set values may be obtained by varying the relative amounts of the components within the specified ranges.

Use of larger amounts of quaternary compounds tends to increase the cure rates and provide a tighter cure. However, excessive amounts may promote excessive curing on aging and effect, for example, higher compression set and lower elongation values. Generally, when an amine is used, the lowest amount of amine which will provide the desired rate of cure and level of compression set at practical curing temperatures is preferred and, in fact, amounts much in excess of about 2.5 pphr. are undesirable because of adverse effect on heat aging properties.

Of the acid acceptors, magnesium oxide is preferred. At least about 2 pphr. is required to provide a reasonable level of cure and rate of cure. While a satisfactorily curable composition can be obtained using only, for example, three parts of an optional base such as calcium hydroxide, it is generally preferred to use at least one part of acid acceptor such as magnesium oxide, along with the optional base to obtain improved resistance to heat aging. The maximum amount for the acid acceptor as listed above is not critical, as much as 50 to 60 pphr. producing a usable but hard stock. Generally, however, no more than about 25 parts is necessary for adequate curing. Alternatively, zinc oxide, litharge or dibasic lead phosphite may be used in approximately the same proportions, and calcium oxide may sometimes be used.

In addition to the above acid acceptors, when an optional base is desired as an accelerator, it is usually present in amounts of from about 0.5 to 25 pphr. Calcium hydroxide is preferred, barium carbonate being milder and generally being used in somewhat larger amounts. At least about three parts of combined acid acceptor and optional base is generally used, for satisfactory curing. Use of eight parts or more minimizes shrinkage during milling and preforming operations.

Fillers are often added to the polymers discussed above to improve the molding characteristics and other properties. When a filler is employed it is added to the vulcanization recipe in amounts of up to about 100 parts pphr., preferably between about 15 and about 50 parts. Examples of fillers which may be used are reinforcing thermal grade carbon blacks or non-black pigments of relatively low reinforcement characteristics such as clays, barytes, silicas, silicates, etc. Plasticizers, softeners and processing aids, preferably esters or ketones, may also be added if desired.

In accordance with this invention, the desired amount of the components of the crosslinking system is added to the unvulcanized fluorocarbon polymer (i.e., gum stock) and is intimately admixed therewith or compounded by employing any of the usual rubber mixing devices, such as Banbury mixers, roll mills, or any other convenient mixing device. It has been found that a two-roll rubber mill equipped with heat exchange means, e.g. cored chambers for cooling, is particularly suitable since the heat generated by the high shearing forces in mixing can be dissipated and the temperature more accurately regulated with this device or with devices providing other means for temperature control.

For best results the temperature of the mixture on the mill is not allowed to rise above about 120° C. (250° F.) and is not allowed to fall below 0° C. (32° F.). During milling it is necessary to distribute the crosslinking agent uniformly throughout the curable polymer. However, it is also desirable to prevent extensive crosslinking in the compounding step because most of these fluorinated polymers cannot be molded or extruded after a substantial amount of crosslinking has taken place.

The curing process typically comprises pressing the compounded mixture in a mold and then baking the pressing in an oven. Pressing of the compounded mixture (press cure) is conducted at a temperature between about 95° C. (200° F.) and about 230° C. (450° F.) preferably between about 150° and 205° C. (300° and 400° F.) for a period of from 1 minute to about 15 hours, usually from 5 minutes to 30 minutes. A pressure of between about 7 and about 210 kg./cm.$^2$, preferably between about 35 and about 70 kg./cm.$^2$, is imposed on the compounded mixture in the mold. The molds may be first coated with release agents, such as a silicone oil, and prebaked. The molded vulcanizate is then usually post cured (oven cured) at a temperature between about 150° and 315° C. (300° and 600° F.) usually at about 205° C. (400° F.) for a period of from 2 hours or less to 50 hours depending on the cross-sectional thickness of the sample. The temperature during the post cure is usually raised gradually from the lower limit of the range to the desired maximum temperature selected. The maximum temperature used is preferably about 260° C. (500° F.) and is held at this value for at least 24 hours.

Curing characteristics of vulcanizable compositions are determined by means of the Mooney tests at 120° C. (250° F.) and 160° C. (320° F.) (ASTM D1646–63), the lower temperature test being indicative of the tendency to "scorch" and the data at 160° and 168° C. (320° and 335° F.) being indicative of rate of cure during molding and extrusion. More recently, an oscillating disc rheometer test (ASTM D2084–71T) has been developed to provide another measure of curing characteristics. Data in Table II were obtained in accordance with ASTM D2084–71T, using an oscillator frequency of 900 c.p.m., at an amplitude of ±3 degrees. Tear strengths are determined by ASTM Method D624–54 using die C.

The following examples, each of which includes several runs, are offered to provide better understanding of the present invention and are not to be unnecessarily construed as limiting the scope thereof. Furthermore, certain runs in these examples are provided for purposes of comparison as noted below. In these examples salts and hydrates are ground to about 200 mesh (70 micron) or less. Hydrates are used in the invention in proportions such that there should generally be 0.5 to 0.6 part of releasable water per 100 parts of elastomer. It will be seen that it is more accurate to designate the amount of hydrate in this fashion than by total weight of hydrate because the proportions of releasable water vary over very great extremes. The physical properties and chemical resistance of all the cured materials are comparable to those of the control (Example 1, run 1).

EXAMPLE 1

This example compares results obtained using a single fluoroelastomeric copolymer filled with carbon black with various hydrated salts. The results are summarized in Table II.

Runs 1 and 2 show the comparative acceleration of curing attained by doubling the amount of $Ca(OH)_2$. In addition, there is loss of elongation at break in the product of run 2 which is found to be 85% of that of the control (run 1) and which is further reduced to 78% of the control after heat-aging for 70 hours at 276° C. (528° F.). Comparison of runs 3 and 5 with runs 4 and 6 respectively, shows the relative benefits from use of hydrates over the corresponding anhydrous salt.

TABLE II

| Run | 1 | 2 | 3 | 4 | 5 | 6 | 7 | 8 | 9 | 10 | 11 | 12 |
|---|---|---|---|---|---|---|---|---|---|---|---|---|
| Fluoroelastomer $C_3F_6/CF_2=CH_2$, 20/80 mol/ratio | 100 | 100 | 100 | 100 | 100 | 100 | 100 | 100 | 100 | 100 | 100 | 100 |
| Carbon black | 30 | 30 | 30 | 30 | 30 | 30 | 30 | 30 | 30 | 30 | 30 | 30 |
| Magnesium oxide | 3 | 3 | 3 | 3 | 3 | 3 | 3 | 3 | 3 | 3 | 3 | 3 |
| Calcium hydroxide | 6 | 12 | 6 | 6 | 6 | 6 | 6 | 6 | 6 | 6 | 6 | 6 |
| Triphenyl benzyl phosphonium chloride | 0.5 | 0.5 | 0.5 | 0.5 | 0.5 | 0.5 | 0.5 | 0.5 | 0.5 | 0.5 | 0.5 | 0.5 |
| 2,2-bis(p-hydroxyphenyl) hexafluoropropane | 1.7 | 1.7 | 1.7 | 1.7 | 1.7 | 1.7 | 1.7 | 1.7 | 1.7 | 1.7 | 1.7 | 1.7 |
| $MgSO_4$ (anhydrous) | | | | 2.4 | | | | | | | | |
| $MgSO_4 \cdot 7H_2O$ | | | | | 0.9 | | | | | | | |
| $CaSO_4$ (anhydrous) | | | | | | 2.5 | | | | | | |
| $CaSO_4 \cdot 2H_2O$ | | | | | | | 2 | 5 | | | | |
| $Al_2(SO_4)_3 \cdot 18H_2O$ | | | | | | | | | 1.24 | | | |
| $Ca_3(C_6H_5O_7)_2 \cdot 4H_2O$ | | | | | | | | | | 4.8 | | |
| $Co(C_2H_3O_2)_2 \cdot 4H_2O$ | | | | | | | | | | | 2.1 | |
| $Na_3C_6H_5O_7 \cdot 2H_2O$ | | | | | | | | | | | 4.9 | |
| $Fe(NH_4)(SO_4)_2 \cdot 12H_2O$ | | | | | | | | | | | | 1.4 |
| Curing characteristics: | | | | | | | | | | | | |
| Mooney, 120° C. (250° F.): | | | | | | | | | | | | |
| 10 pt. rise (min.) | 25+ | 25+ | 25+ | 25+ | 25+ | 25+ | 19 | 25+ | 25+ | 21 | 25+ | 25+ |
| 25 min. rise (pts.) | 1 | 1 | 2 | 1 | 1 | 4 | 21 | 5 | 3 | | 1 | 2 |
| Mooney, 160° C. (320° F.): | | | | | | | | | | | | |
| 5 pt. rise (min.) | 6.0 | 5.0 | 6.2 | 4.8 | 6.3 | 4.0 | 3.3 | 4.3 | 4.2 | 3.3 | 4.9 | 4.3 |
| 10 pt. rise (min.) | 6.7 | 5.4 | 6.9 | 5.3 | 7.1 | 4.3 | 3.8 | 4.6 | 4.7 | 3.6 | 5.3 | 4.8 |
| 15 pt. rise (min.) | 7.2 | 5.7 | 7.3 | 5.6 | 7.6 | 4.6 | 4.0 | 5.0 | 5.0 | 3.8 | 5.6 | 5.3 |
| 30 pt. rise (min.) | 8.0 | 6.2 | 8.1 | 6.1 | 8.3 | 5.0 | 4.3 | 5.6 | 5.5 | 4.4 | 5.8 | 5.8 |
| Rheometer, 160° C. (320° F.): | | | | | | | | | | | | |
| Initial torque (lbf./in.) | 53 | 71 | | | | | | | | | | |
| Minimum torque (lbf./in.) | 28 | 32 | | 30 | | 28 | | 2.9 | | 30 | 28 | 26 |
| Time to 1 lb. rise (min.) | 6.6 | 5.5 | 6.3 | 4.7 | | 4.1 | | 2.8 | 4.9 | 2.4 | 3.2 | 3.7 |
| Time to 50 lb. rise (min.) | 9.4 | 7.8 | 8.4 | 6.5 | | 5.0 | | 4.2 | 6.5 | 3.9 | 4.2 | 5.2 |
| Time to 70 lb. rise (min.) | 10.0 | 8.3 | 8.9 | 6.9 | | 5.4 | | 4.5 | 7.1 | 4.8 | 4.5 | 5.7 |

EXAMPLE 2

This example compares results using silica and silicate fillers with carbon filler. The copolymer is the same as that of Example 1 and only a single hydrated salt is used. The results are in Table III.

In Table III it will be seen that only runs 16 and 18 are compositions according to the invention. Run 13 is a standard carbon-filled formulation as compared to runs 14 and 17 which show the retarding effect of silica and a silicate filler respectively. The speed can be regained by increased base (run 15). This product is found to have low elongation and poor heat-aging properties. The compositions of the invention, runs 16 and 18, regain the speed with properties comparable to those of the carbon-filled control.

TABLE III

| Run | 13 | 14 | 15 | 16 | 17 | 18 |
|---|---|---|---|---|---|---|
| Fluoroelastomer $C_3F_6/CF_2=CH_2$, 20/80 mol ratio | 100 | 100 | 100 | 100 | 100 | 100 |
| Carbon black | 30 | | | | | |
| Magnesium oxide | 3 | 3 | 6 | 3 | 3 | 3 |
| Calcium hydroxide | 6 | 6 | 12 | 6 | 6 | 6 |
| Triphenyl benzyl phosphonium chloride | 0.5 | 0.5 | 0.5 | 0.5 | 0.5 | 0.5 |
| Bis(p-hydroxyphenyl)hexafluoropropane | 1.7 | 1.7 | 1.7 | 1.7 | 1.7 | 1.7 |
| Silica | | 22 | 22 | 22 | | |
| Calcium silicate | | | | | 22 | 22 |
| $MgSO_4 \cdot 7H_2O$ | | | | 5 | | 3 |
| Mooney, 168° C. (335° F.): | | | | | | |
| Initial | 61 | 88 | 110 | 68 | 136 | 87 |
| Minimum | 32 | 49 | 60 | 54 | 54 | 38 |
| 5 pt. rise (min.) | 5.2 | 9.5 | 6.2 | 2.4 | 14.8 | 5.2 |
| 10 pt. rise (min.) | 5.8 | 10.7 | 6.2 | 3.3 | 17.3 | 5.6 |
| 15 pt. rise (min.) | 6.2 | 11.8 | 6.7 | 3.6 | 18.6 | 5.9 |
| 30 pt. rise (min.) | 6.8 | 13.3 | 7.3 | 4.1 | 22.8 | 6.6 |

EXAMPLE 3

This example is similar in general procedure to that of Example 1 except that a combination of two fluoroelastomers is employed (run 19) as well as a lower level of hydrated salt.

| Material: | Part phr. |
|---|---|
| $C_3F/CF_2=CH_2$ 20/80 mol. ratio | 90 |
| $C_2F_3Cl/CF_2=CH_2$ 20/80 mol. ratio | 10 |
| Carbon black | 30 |
| Calcium hydroxide | 6 |
| Magnesium hydroxide | 3 |
| $MgSO_4 \cdot 7H_2O$ | 0.5 |
| Triphenylbenzyl phosphonium chloride | 0.5 |
| 2,2-bis(p-hydroxyphenyl)hexafluoropropane | 1.7 |

The ingredients are milled together, molded into sheets and pressured at 168° C. (335° F.) for 20 minutes followed by post curing for 24 hours at 260° C. (500° F.). The molded sheets are well formed. The tear strength after press curing is 10.2 kg./cm.² (146 p.s.i.) and after post curing is 8.06 kg./cm.² (115 p.s.i.).

For comparison other sheets are prepared (run 20) in which 100 parts of the perfluoropropene-vinylidene fluoride copolymer is used instead of the 90 parts of that and 10 parts of $C_2F_3Cl$ copolymer in run 19. Sheets are produced in the same way and have a tear strength of 5.6 kg./cm.² (80 p.s.i.) after press curing and 6.4 kg./cm.² (91 p.s.i.) after post curing.

Other sheets are made (run 21) as in run 19, but omitting the $MgSO_4 \cdot 7H_2O$ (and hence not being the process of the invention). Under the same conditions the sheets are poorly formed and contain blisters indicating inadequate press cure.

What is claimed is:

1. Curable fluoroelastomer composition comprising:
(A) a fluorinated elastomeric copolymer of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units;
(B) at least one quaternary phosphonium or quaternary ammonium compound, including quaternary phosphonium and ammonium hydroxides and salts thereof;
(C) a salt hydrate containing water relatively firmly bonded at ambient temperatures but readily released at a temperature of from about 120° C. to about 175° C., said salt hydrate being in an amount to give 0.1 to 3 parts by weight of water per hundred parts of elastomeric copolymer.

2. Curable fluoroelastomer composition according to claim 1 wherein there is a quaternary phosphonium compound as curing agent.

3. Curable fluoroelastomer composition according to claim 2 additionally containing thermal carbon filler.

4. Process for accelerating the cure of fluorinated elastomeric copolymers, optionally containing filler, of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units, said cure being effected by a catalyst of the class of quaternary ammonium or quaternary phosphonium compounds characterized by incorporation by conventional means of a salt hydrate containing water relatively firmly bonded at ambient temperatures but readily released at a temperature of from about 120° C. (250° F.) to about 175° C. (350° F.), said hydrate being in an amount to give 0.1 to 3 parts by weight of water per hundred parts of elastomeric copolymer.

5. Process according to claim 4 wherein silicate or silica filler is included in the elastomeric copolymer.

6. Curable fluoroelastomer composition according to claim 1 additionally containing from 2 to 25 parts per hundred parts of copolymer of an acid acceptor.

7. Curable fluoroelastomer composition according to claim 1 additionally comprising 0.5 to 10 parts per 100 parts of copolymer of an optional base.

8. Curable fluoroelastomer composition according to claim 1 additionally comprising up to 2.5 parts by weight per hundred of copolymer of an amine cocurative having an amine equivalent weight below about 500.

References Cited

UNITED STATES PATENTS

| 3,580,889 | 5/1971 | Barney | 260—47 |
| 3,463,762 | 8/1969 | Trischler | 260—77.5 |
| 3,591,547 | 7/1971 | Boudakian et al. | 260—32.8 |
| 3,563,939 | 2/1971 | Stevens | 260—37 |
| 3,645,991 | 2/1972 | Nersasian | 260—80.77 |
| 3,655,727 | 4/1972 | Patel | 260—470 P |
| 3,712,877 | 1/1973 | Patel | 260—87.7 |

ALLAN LIEBERMAN, Primary Examiner

R. ZAITLEN, Assistant Examiner

U.S. Cl. X.R.

260—80.7, 87.7

UNITED STATES PATENT OFFICE
CERTIFICATE OF CORRECTION

Patent No. 3,809,672          Dated May 7, 1974

Inventor(s) David A. Stivers

It is certified that error appears in the above-identified patent and that said Letters Patent are hereby corrected as shown below:

Column 5, line 7, "a" should read -- as --.
Column 6, line 8, "compound" should read -- compounds --.
Column 7, line 47, "$K_4P_2O \cdot 3H_2O$" should read -- $K_4P_2O_7 \cdot 3H_2O$ --.
Column 10, line 24, "part" should read -- parts --.

Signed and sealed this 24th day of September 1974.

(SEAL)
Attest:

McCOY M. GIBSON JR.          C. MARSHALL DANN
Attesting Officer            Commissioner of Patents